(12) United States Patent
Lindner et al.

(10) Patent No.: US 6,443,285 B2
(45) Date of Patent: Sep. 3, 2002

(54) THRUST PLATE ASSEMBLY

(75) Inventors: Joachim Lindner, Dittelbrunn; Reinhold Weidinger, Unterspiesheim, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 59 days.

(21) Appl. No.: 09/734,277

(22) Filed: Dec. 11, 2000

(30) Foreign Application Priority Data

Dec. 10, 1999 (DE) .......................................... 199 59 584

(51) Int. Cl.$^7$ ............................................... F16D 13/75
(52) U.S. Cl. ................................ 192/70.25; 192/111 A
(58) Field of Search ........................ 192/70.25, 111 A, 192/89.22, 89.23, 89.24

(56) References Cited

U.S. PATENT DOCUMENTS

| | | | | |
|---|---|---|---|---|
| 5,540,313 A | * | 7/1996 | Weidinger | 192/111 A |
| 5,632,365 A | * | 5/1997 | Maucher | 192/109 A |
| 5,884,741 A | * | 3/1999 | Bokisch et al. | 192/111 A |
| 5,971,124 A | * | 10/1999 | Maucher | 192/111 A |

FOREIGN PATENT DOCUMENTS

DE 29 20 932 11/1979

* cited by examiner

*Primary Examiner*—Saul Rodriguez
(74) *Attorney, Agent, or Firm*—Cohen, Pontani, Lieberman & Pavane

(57) ABSTRACT

A thrust plate assembly for a motor vehicle friction clutch with automatic wear compensation includes a housing fixedly connectable to a flywheel for joint rotation with the flywheel about an axis of rotation, a pressure plate arranged in the housing such that the pressure plate is fixed with respect to rotation relative to the housing and axially displaceable relative to the housing, an energy accumulator such as a diaphragm spring having one side supported at the housing and another side supported at the pressure plate, and a wear adjustment device arranged in the support path of the energy accumulator between the energy accumulator and a component of the housing and pressure plate. The wear adjustment device has at least one adjustment element which is displaceable to compensate for wear and is operatively arranged for effecting wear compensation in proportion to the occurring wear. The ratio of movement of the wear adjustment device to the amount of occurring wear differs from 1:1.

23 Claims, 6 Drawing Sheets

THRUST PLATE ASSEMBLY

BACKGROUND OF THE INVENTION

1. Field of the Invention

The present invention is directed to a thrust plate assembly for a motor vehicle friction clutch with automatic wear compensation including a housing that is fixedly connectable to a flywheel for joint rotation with the flywheel about an axis of rotation, a pressure plate arranged in the housing such that the pressure plate is fixed with respect to rotation relative to the housing and axially displaceable relative to the housing, an energy accumulator having one side supported at the housing and another side supported at the pressure plate, and a wear adjustment device arranged in the support path of the energy accumulator between the energy accumulator and a component of the housing and pressure plate and including at least one adjustment element which is displaceable to compensate for wear, the wear adjustment device being operatively arranged for compensating for wear in proportion to the occurring wear.

2. Description of the Related Art

A prior art thrust plate assembly is disclosed in German reference DE-A-29 20 932 having a wear adjustment device with an adjustment ring with a plurality of surface regions arranged successively in circumferential direction. These plural surface regions are inclined relative to the circumferential direction and contact corresponding counter-surfaces of a pressure plate which are inclined relative to the circumferential direction. During a rotation of this adjustment ring in circumferential direction, i.e., in a wear adjustment movement direction, the surfaces and counter-surfaces slide against one another so that the adjustment ring is displaced axially in relation to the pressure plate and compensates, e.g., for wear occurring in the region of friction facings. The adjustment ring is pretensioned by an adjusting spring for movement in the circumferential movement direction. In this known thrust plate assembly, an area of a diaphragm spring acting on the adjustment ring is swiveled during a disengaging or releasing movement and the pressure plate follows this movement of the diaphragm spring essentially completely. However, if wear which is detectable by a play sensor of the thrust plate assembly has occurred previous to the disengaging movement, the release path of the pressure plate is limited so that at the end of the movement travel or lift of the diaphragm spring, the pressure plate no longer follows this lift and the wear adjustment device, i.e., the adjustment ring, is consequently released for carrying out the compensating movement mentioned above. The extent to which the pressure plate no longer follows the lifting off movement of the diaphragm spring corresponds precisely to the wear previously detected by the play sensor. The precise amount of this release path that is no longer traveled is compensated by the wear adjustment device. Therefore, the adjustment ring initially directly contacts the diaphragm spring again during an engagement process to be carried out subsequently and finally the diaphragm spring acts upon the subassembly formed of the pressure plate and adjustment ring to the precise extent and manner as with a clutch disk which does not exhibit any wear. Even when wear occurs, the installation position of the diaphragm spring does not change over the life of a thrust plate assembly of this type so that the releasing force required remains essentially the same and the clutch characteristic remains essentially unaltered.

SUMMARY OF THE INVENTION

An object of the present invention to provide a thrust plate assembly which has an improved capacity for adapting to operating conditions which change over the operating life of a clutch.

The object is met according to an embodiment of the present invention by a thrust plate assembly for a friction clutch in a motor vehicle with automatic wear compensation, comprising a housing fixedly connectable to a flywheel for joint rotation with the flywheel about an axis of rotation, a pressure plate arranged in the housing such that the pressure plate is fixed with respect to rotation relative to the housing and axially displaceable relative to the housing, an energy accumulator such as a diaphragm spring having one side supported at the housing and another side supported at the pressure plate, and a wear adjustment device arranged in the support path of the energy accumulator between the energy accumulator and a component of the housing and pressure plate. The wear adjustment device has at least one adjustment element which is displaceable to compensate for wear and is operatively arranged for effecting wear compensation in proportion to the occurring wear.

In the thrust plate assembly according to the present invention, the ratio of movement of the wear adjustment device to the amount of wear differs from 1:1.

As was already noted, the axial expansion of the subassembly formed of the pressure plate and adjustment ring when carrying out wear compensation in the prior art is exactly the same as the extent to which friction linings become thinner. However, it has been determined that other characteristics of the thrust plate assembly which change over its useful life are not accounted for by this arrangement. It has been recognized, for example, that the operating characteristic, i.e., force characteristic, of a spring element such as an energy accumulator changes over the operating life. This property of the spring element is taken into account by the present invention in that a compensation process is not implemented in a ratio of 1:1 to the actually occurring wear. Rather, it is ensured by diverging from this ratio of 1:1 in a defined manner that the installation position of the energy accumulator changes in spite of the occurrence of wear and the execution of a compensating movement compelled by the occurrence of wear.

According to the present invention, when a spring force decreases in a determined installation position due to fatigue, wear compensation may be effected to a determined degree while simultaneously bringing the energy accumulator into a position which allows the spring to generate a higher force than in the original installation position, i.e., in the new state. Therefore, the defined selection of the ratio, which now no longer takes into account the exact wear actually occurring, accounts for many different variables which are known to change over the operating life of a clutch. In this way, the operating characteristic of a thrust plate assembly of this type and a clutch outfitted with this thrust plate assembly may be maintained in an improved manner.

The thrust plate assembly according to the present invention may, for example, comprise at least one adjustment element that is movable in a wear adjustment movement direction corresponding to occurring wear and that the movement in the wear adjustment movement direction causes a displacement of at least one adjustment element in a compensating movement direction different than the wear adjustment movement direction, and that the extent of movement in the compensating movement direction for wear and the wear itself is in a ratio other than 1:1.

A desired ratio between the wear which occurs and is detected and the compensation that is actually implemented is achieved in that the at least one adjustment element moves in the wear adjustment movement direction with a surface inclined in the wear adjustment movement direction along a counter-surface. Alternatively, the desired ratio may be achieved in that the at least one adjustment element moves along a counter-surface inclined in the wear adjustment movement direction. In both cases, the angle of inclination of the surface or counter-surface is selected in such a way that the extent of movement in the compensating movement direction is in a ratio to wear other than 1:1.

To detect wear in operation, the thrust plate assembly according to the invention may have at least one play sensor arrangement with a detection element having a detection portion arranged for interacting with a component or subassembly for detecting wear. The component or subassembly with which the detection portion is interactable is displaceable with respect to another component when wear occurs. Therefore, when wear occurs, the detection element is positioned corresponding to the wear detected by the interaction with the component or subassembly.

To achieve the desired stopping of the movement of each detection element, an embodiment of the present invention includes a stopping element displaceable in a stopping movement direction by a movement extent or distance corresponding to the wear to stop the detection element when wear occurs. The stopping element has a blocking member for cooperating with the at least one adjustment element to limit the movement of the adjustment element in the wear adjustment movement direction to an extent corresponding to the wear.

The wear adjustment movement direction of the at least one adjustment element is in the same direction as the movement of the stopping element in the stopping movement direction so that the cooperation between the stopping element and the at least one adjustment element in the simplest possible manner.

For example, the stopping movement direction and the wear adjustment movement direction may correspond essentially to a circumferential movement direction. The blocking member then preferably forms a stop acting substantially in the wear adjustment movement direction. In this arrangement, the stop acts directly in the direction in which the at least one adjustment element moves under pretensioning to effect a compensating movement. In contrast to the prior art in which the generated compensating movement, i.e., the axial movement, is directly limited by a stop which acts axially in a corresponding manner, the present invention limits a movement which may, for example, be in the circumferential direction which does not necessarily require an axial stop. Therefore, the movement in the compensating movement direction, i.e., the actual axial expansion of the wear adjustment device, may be configured to be different than the wear that has occurred in any desired manner. The movement in the compensating movement direction is decoupled from a determined extent of axial movement and the extent of axial movement is predetermined by this movement in the wear adjustment movement direction.

The stopping element may, for example, be wedge-shaped with an angle of the wedge-shaped stopping element differing from an angle of inclination of the surface or counter-surface. Therefore, a movement distance of the stopping element in its stopping movement direction is equal to the movement distance of the at least one adjustment element in the wear adjustment movement direction. However, the axial expansion of the wear adjustment device or of the subassembly formed of the pressure plate and the at least one adjustment element which occurs is different from the actual or detected wear because of the different angle of inclination between the wedge-shaped stopping element and the surface or counter-surface. Accordingly, the ratio differing from 1:1 is achieved.

In a further embodiment, one of the wedge angle of the stopping movement direction and the angle of the surface/counter-surface may be arranged so that it is not constant in the wear adjustment direction. This allows characteristics of the thrust plate assembly which do not change linearly over the operating life of a thrust plate assembly of this kind to be taken into account.

In particular, if the setting of a spring used as energy accumulator is to be taken into account with the present invention, the ratio is less than 1:1 and preferably in the range including 0.6 to 0.95.

As discussed above, the ratio may change as compensation of wear increases, i.e., over the operating life of the thrust plate assembly, to take into account influencing variables which do not change linearly. For this purpose, the ratio preferably increases as the compensation of wear increases. The increase of the ratio as the compensation of wear increases allows the influence of "spring setting", as it is called, to be accounted for in which springs, e.g., diaphragm springs, which are used as energy accumulators change their characteristic relatively dramatically in the initial phase of their operating life and remain virtually unchanged or change only slightly after this initial relatively sharp change in characteristic.

According to another embodiment of the present invention, the object is met by a thrust plate assembly for a motor vehicle friction clutch with automatic wear compensation, comprising a housing fixedly connectable to a flywheel for joint rotation jointly with the flywheel about an axis of rotation, a pressure plate which is arranged in the housing so that the pressure plate is fixed with respect to rotation relative to the housing and is axially displaceable relative to the housing, an energy accumulator such as a diaphragm spring having one side supported at the housing and another side supported at the pressure plate, and a wear adjustment device arranged in the support path of the energy accumulator between the energy accumulator and a component of the housing and pressure plate. The wear adjustment device has at least one adjustment element displaceable to compensate for wear and is pretensioned for movement in a wear adjustment movement direction. When the wear adjustment device moves in the wear adjustment movement direction, a surface of the at least one adjustment element inclined in the wear adjustment movement direction moves along a counter-surface. Furthermore, the at least one adjustment element may be blocked by at least one blocking member to prevent movement in the wear adjustment movement direction. The thrust plate assembly further comprises at least one play sensor arrangement for detecting wear, wherein the at least one play sensor arrangement comprises a detection element which interacts with or can be made to interact with a component or subassembly for detecting wear. The component or subassembly is displaceable with respect to another component of the thrust assembly when wear occurs so that the detection element is brought into a position corresponding to the wear by the interaction with the component or subassembly.

This thrust plate assembly includes a stopping element for stopping the detection element of the at least one play sensor arrangement in its position corresponding to the wear. Furthermore, the at least one blocking member is provided at the stopping element.

According to this embodiment, a blocking of the movement of the at least one detection element is not required to act in axial direction as was the case in the prior art. Therefore, a desired conversion of the amount of detected wear into the compensating movement associated with the operating life may be effected.

For this purpose, the at least one blocking member may be arranged to interact with the at least one adjustment element so as to block essentially in the wear adjustment movement direction.

The counter-surface may be formed at the one component on which the wear adjustment device is arranged. Also, the at least one detection element may be arranged with a detection portion for interacting with the component or subassembly. For example, the component or subassembly that interacts with the detection element may comprise the housing or the energy accumulator or any component which moves relative to the pressure plate when wear occurs.

At least a portion of the detection element may be located between the at least one adjustment element and the one component on which the adjustment element is arranged. The at least one adjustment element may, for example, comprise an adjustment ring which is arranged substantially concentric to the axis of rotation. Furthermore, the one component is the pressure plate and the detection portion of the at least one detection element projects through an intermediate space formed between the adjustment ring and the pressure plate. Further, the stopping element is displaceable in a stopping movement direction when wear occurs by a movement amount corresponding to the wear to stop the detection element in its position corresponding to wear. In this respect, it is preferable for the wear adjustment movement direction of the at least one adjustment element to be the same direction as the stopping movement direction of the stopping element. The wear adjustment movement direction and the stopping movement direction is preferably a circumferential direction.

The present invention is further directed to a friction clutch with a thrust plate assembly according to the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
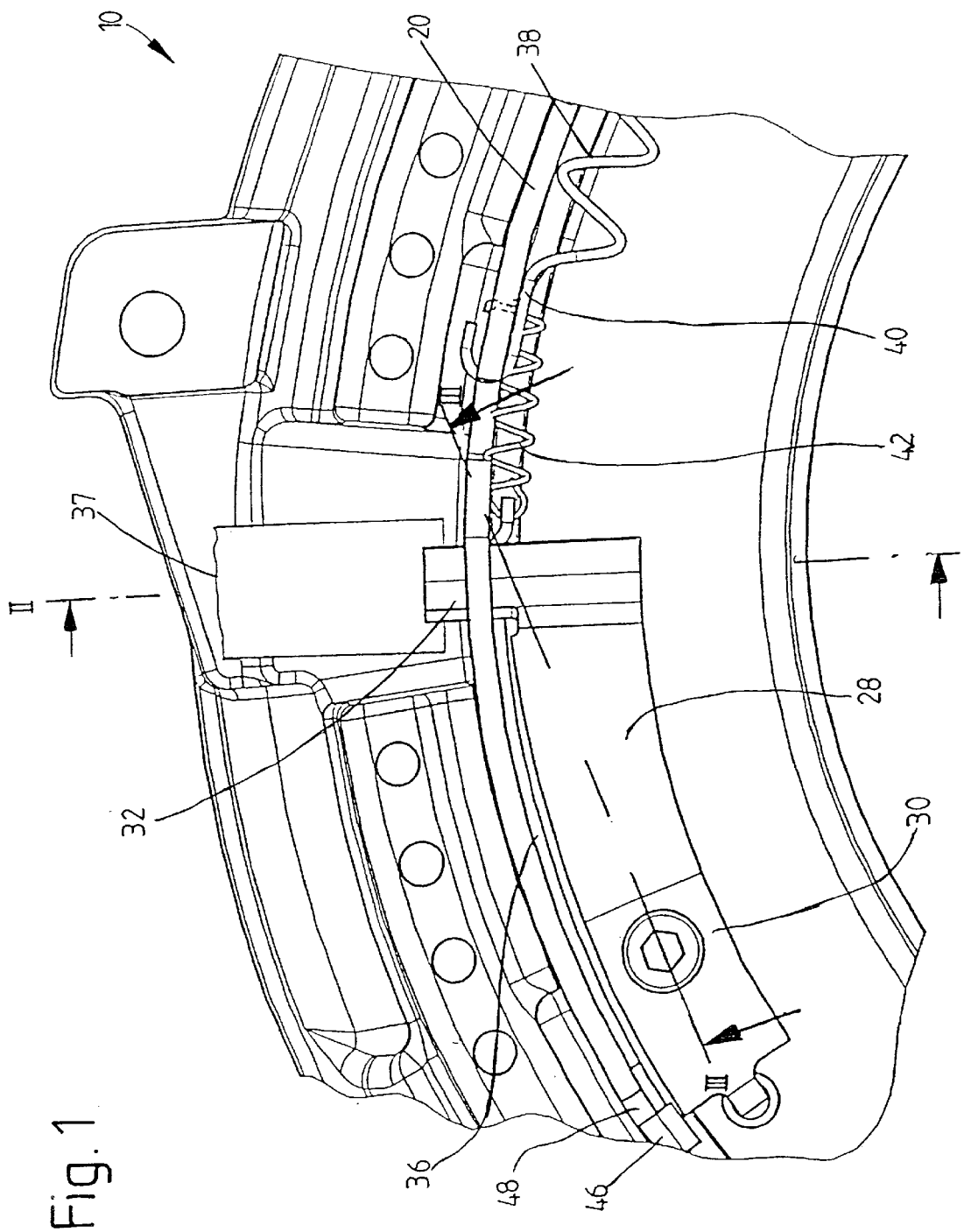
FIG. 1 is a partial axial sectional view of a thrust plate assembly according to an embodiment of the present invention in which the housing and energy accumulator are omitted.
Figure 2:
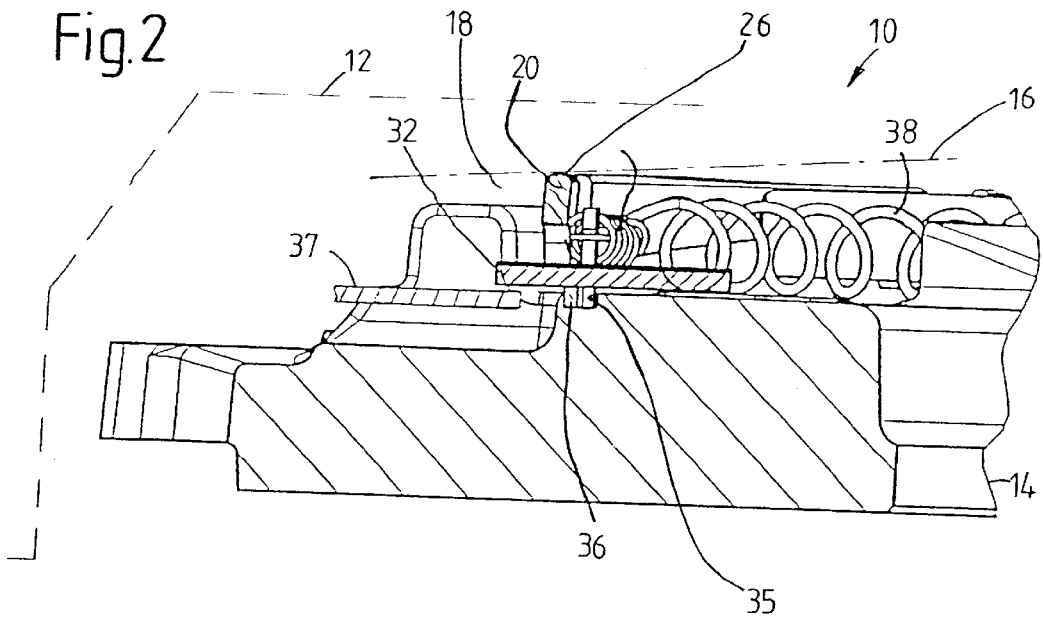
FIG. 2 is a sectional view of the thrust plate assembly of FIG. 1 along line II—II in FIG. 1.
Figure 3:
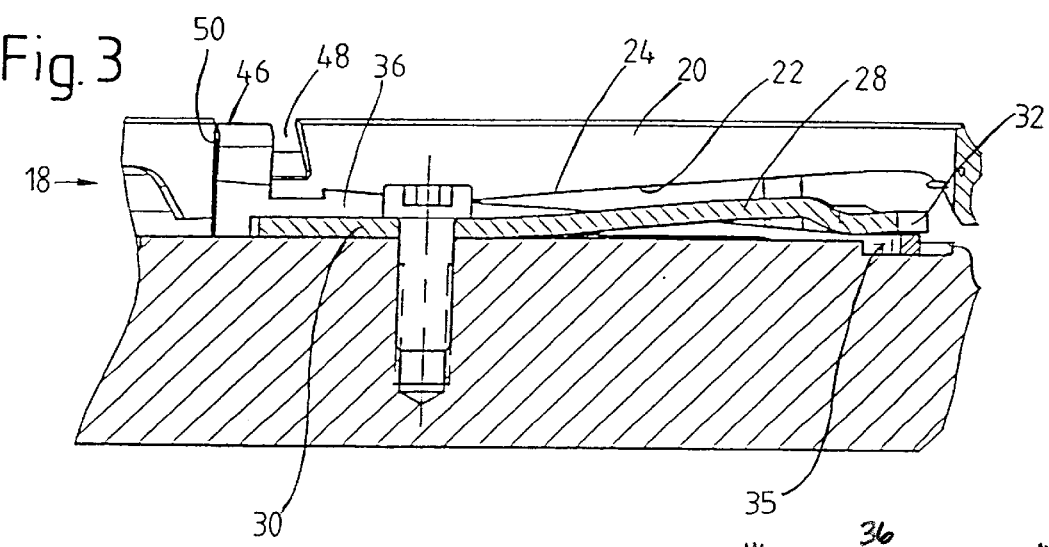
FIG. 3 is a sectional view of the thrust plate assembly of FIG. 1 along line III—III in FIG. 1.

FIGS. 1 to 5 show a thrust plate assembly 10 according to an embodiment of the present invention. The thrust plate assembly 10 includes a housing 12 (shown schematically in FIG. 2) via which the thrust plate assembly 10 is connectable to a flywheel (not shown) which may comprise any type of flywheel such as, for example, a dual mass flywheel. A pressure plate 14 is arranged in the housing 12 and is held at the housing 12 by tangential leaf springs (also not shown) so that the pressure plate 14 is fixed with respect to rotation relative to the housing 12 and axially movable relative to the housing 12. Friction facings of a clutch disk, for example, may then be clamped between the pressure plate 14 and the flywheel as is known in the art. The thrust plate assembly 10 shown in FIG. 2 is a push-type thrust plate assembly with an energy accumulator 16 such as, for example, a diaphragm spring, having a radial outer area supported at the pressure plate 14 via a wear adjustment device 18 and a radial central area supported at the housing 12 via, for example, spacer pins (not shown). The radial inner area of the energy accumulator 16 is actuatable by a clutch release mechanism, so that it is pushed into the housing 12 for implementing a release process to at least partially cancel the action of the energy accumulator upon the pressure plate 14.

In the embodiment of FIGS. 1–5, the wear adjustment device 18 comprises an adjustment ring 20 which is substantially concentric to an axis of rotation, not shown. The adjustment ring 20 has a plurality of inclined surface regions 22 facing the pressure plate 14 which are arranged successively in circumferential direction and inclined relative to the circumferential direction (see FIG. 5). These inclined surface regions 22 rest on counter-inclined inclined surface regions 24 of the pressure plate 14 which are inclined in circumferential direction in a corresponding manner. When the adjustment ring 22 moves in circumferential direction with respect to the pressure plate 14 as will be described in the following, the inclined surface regions 22 slide along the counter-inclined surface regions 24 so that the adjustment ring 20 is simultaneously displaced in axial direction during the circumferential movement by the surface regions 22, 24 which slide against one another and which are inclined with respect to the circumferential direction. As a result of this displacement in axial direction, a portion 26 of the adjustment ring 20 acted upon by the diaphragm spring 16 is displaced axially with respect to the pressure plate 14.

A detection element 28 is arranged as play sensor at the pressure plate 14. The detection element 28 is located radially inside the adjustment ring 20 and extends approximately in circumferential direction proceeding from an end portion of the adjustment ring 20 that is fixed to the pressure plate 14. The detection element 28 may be produced from spring steel such as, for example, a leaf spring. The detection element 28 has a detection portion 32 that projects radially outward through a through-opening 34 formed between the adjustment ring 20 and the pressure plate 14. In this area, the detection portion 32 overlaps in circumferential direction and in radial direction with a blocking element 37 which is shown only schematically in the drawings and which may, for example, be fastened to the housing 12 or constructed as in integral part therewith.

Further, the thrust plate assembly 10 includes a stopping element 36 associated with the detection element 28. The stopping element 36 extends essentially in circumferential direction and is located at the inner side of the adjustment ring 20 between the adjustment ring 20 and the detection element 28. The stopping element 36 is wedge-shaped and extends in an intermediate space 35 formed between the detection portion 32 and the pressure plate 14.

The thrust plate assembly 10 further comprises an adjustment spring 38 associated with the adjustment ring 20. A first end area 40 of the adjustment spring 38 is attached to the adjustment ring 20 and a second end area, not shown, is fastened to the pressure plate 14. The adjustment spring 38 pretensions or biases the adjustment ring 20 toward movement in a wear adjustment movement direction, i.e., a circumferential movement direction. It is noted that guide projections or guide elements are provided with the thrust plate assembly, respectively, to ensure that the adjustment spring 38 and the adjustment ring 20 are held in their installation position surrounding the axis of rotation. Further, a pretensioning spring 42 is arranged to ensure that the stopping element 36 is pulled, accompanied by pretensioning, into the intermediate space 35 formed between the detection portion 32 and the pressure plate 14. The pretensioning spring 42 includes one side which acts on the adjustment ring 20 and another side acting on a locating projection 44 of the stopping element 36. The other circumferential end area of the stopping element 36 has a blocking projection 46 which engages in a corresponding circumferential recess 48 of the adjustment ring 20. The circumferential recess 48 has a larger circumferential extension than the blocking projection 46, thereby allowing relative circumferential movement of the stopping element 36 and the adjustment ring 20 to an extent limited by the recess 48.

The following describes the function and operation of the thrust plate assembly described above and a friction clutch outfitted with the thrust plate assembly during the occurrence of wear.

It is first assumed that in a state without wear the energy accumulator 16 acts on the wear adjustment device 18 and, therefore, on the pressure plate 14 and urges the pressure plate 14 toward the flywheel. During a release process, the radial outside of the energy accumulator 16 releases the wear adjustment device 18. The pressure plate 14 follows the releasing movement of the energy accumulator 16 via the pretensioning force provided by the tangential leaf springs holding the pressure plate 14 at the housing 12. However, a circumferential end face 50 of the blocking projection 46 of the stopping element 36 abuts an oppositely located circumferential surface of the recess 48 of the adjustment ring 20. Therefore, circumferential movement of the adjustment ring 20 which is pretensioned by the adjustment spring 38 is prevented. The stopping element 36 is also blocked against circumferential movement against the pretensioning of the pretensioning spring 42 and the pretensioning by the adjustment spring 38, which pretensioning is transferred to the stopping element 36 via the adjustment ring 20, in that the stopping element 36 abuts against the detection portion 32 of the detection element 28. When the clutch is engaged subsequently, the wear adjustment device 18 is acted upon again by the diaphragm spring 16, so that the adjustment ring 20 is clamped in any case between the energy accumulator 16 and the counter-inclined surface regions 24 of the pressure plate 14.

When wear occurs, for example, during a clutch engagement process, the friction facings of the clutch disk become thinner and the pressure plate 14 moves slightly closer to the flywheel. If the wear is so extensive that the detection portion 32 strikes against the blocking element 37, which will not move when wear occurs, at least the detection portion 32 of the detection element 28 is prevented from further following the axial movement of the pressure plate 14. Consequently, the axial intermediate space 35 between the pressure plate 14 and the detection portion 32 of the detection element 28 becomes larger. The stopping element 36 which is pretensioned in circumferential direction directly enters this enlarged intermediate space with its stopping surface 52. This stopping surface 52 is inclined at a predetermined angle with respect to a base surface or base side 54 of the stopping element 36 supported at the pressure plate 14. The inclination of the stopping surface achieves the wedge shape of the stopping element 36 mentioned above. Accordingly, as a result of the wedge shape, the stopping element 36 moves in a stopping movement direction, i.e., the circumferential direction, until the entire enlarged intermediate space 35 between the pressure plate 14 and the detection portion 32 of the detection element 28 is again filled. Accordingly, the stopping element 36—as predetermined by the wedge angle of the stopping element 36—moves in the stopping movement direction to an extent corresponding to the occurring wear, i.e., corresponding to the axial displacement of the detection portion 32 with respect to the pressure plate 14.

The movement of the stopping element 36 to fill the space 35 causes the blocking projection 46 to move in circumferential direction so that the blocking surface 50 moves away from the oppositely located surface of the recess 48. When the blocking surface 50 moves, the adjustment ring 20 is not blocked by the stopping element 36 against movement in the wear adjustment movement direction, i.e., the circumferential movement direction. Because the clutch and thrust plate assembly is still in the engaged state, the adjustment ring 20 is acted upon by the energy accumulator 16 and is accordingly prevented from rotating.

However, as was already described, during a subsequent release process, the diaphragm spring 16 ceases at least partially to act upon the wear adjustment device 18 and the contact pressing force acting between the adjustment ring 20 and the diaphragm spring 16 is essentially predetermined by the tangential leaf springs. The tangential leaf springs exert a force so slight that the adjustment ring 20 is now movable in the circumferential direction under pretensioning by the adjustment spring 38 until the surface of the recess 48 again strikes the blocking face 50 of the stopping element 36. As a result, the adjustment ring 20 moves in circumferential direction by the same amount as the stopping element 36 has moved to fill the intermediate space caused by the wear. Therefore, the adjustment ring 20 has likewise moved in its wear adjustment movement direction by an amount corresponding to the wear that has occurred.

During this movement in the wear adjustment movement direction, the adjustment ring 20 slides by its inclined surface regions 22 along the counter-inclined surface regions 24 and is accordingly displaced in axial direction, i.e., the compensating movement direction, with respect to the pressure plate 14. This displacement or movement in the compensating movement direction is also in a determined ratio to the occurring wear. That is, the ratio by which the movement in the wear adjustment movement direction, is converted into a movement in axial direction, i.e., in the compensating movement direction, is determined by the angle of inclination of the inclined surface regions 22 and counter-inclined surface regions 24. A flatter angle of inclination of these surface regions 22 and 24 produces a smaller movement in the axial direction for a given circumferential movement than a steep angle of inclination. Therefore, adjusting the angle of inclination of the inclined surface regions 22 or counter-inclined surface regions 24 allows a determination of the extent to which a circumferential movement of the stopping element 36, and therefore of the adjustment ring 20, is converted into an axial movement and accordingly into a compensating movement. However, the extent of the circumferential movement may again be set in a determined ratio to the occurring wear by predetermining the wedge angle of the stopping element 36. To obtain a compensation ratio other than 1, it must accordingly be ensured that the circumferential movement of the adjustment ring 20, which measures the same as the circumferential movement of the stopping element 36, does not produce an axial movement of the adjustment ring 20 which measures the same as the axial relative movement of the detection portion 32 with respect to the pressure plate 14 which occurred previously. This can be achieved, for example, by arranging the wedge angle of the stopping element 36, i.e., the angle between the two surfaces 52 and 54, so that it is different from the angle of inclination of the surface regions 22 or 24 with reference to a circumferential line. To achieve undercompensation of wear, the angle of inclination of the surface regions 22 and 24 must be flatter than the wedge angle of the stopping element 36. To obtain overcompensation, the angle of inclination of the surface regions 22, 23 must be greater than that of the stopping element 36.

This principle according to the present invention, whereby the extent of wear compensation is adjusted by corresponding constructional design and does not depend on the occurring wear in a 1:1 ratio, is enabled by directly limiting the movement of the wear adjustment device 18 in the wear adjustment movement direction and not by an axial stop when the wear adjustment device 18 has also axially moved to a determined extent. In other words, the stopping which is achieved by the blocking projection 46 acts in the circumferential movement direction, i.e., in the wear adjustment movement direction, and not directly in the axial direction, i.e., the compensating movement direction, as was the case in the prior art.

Figure 6:
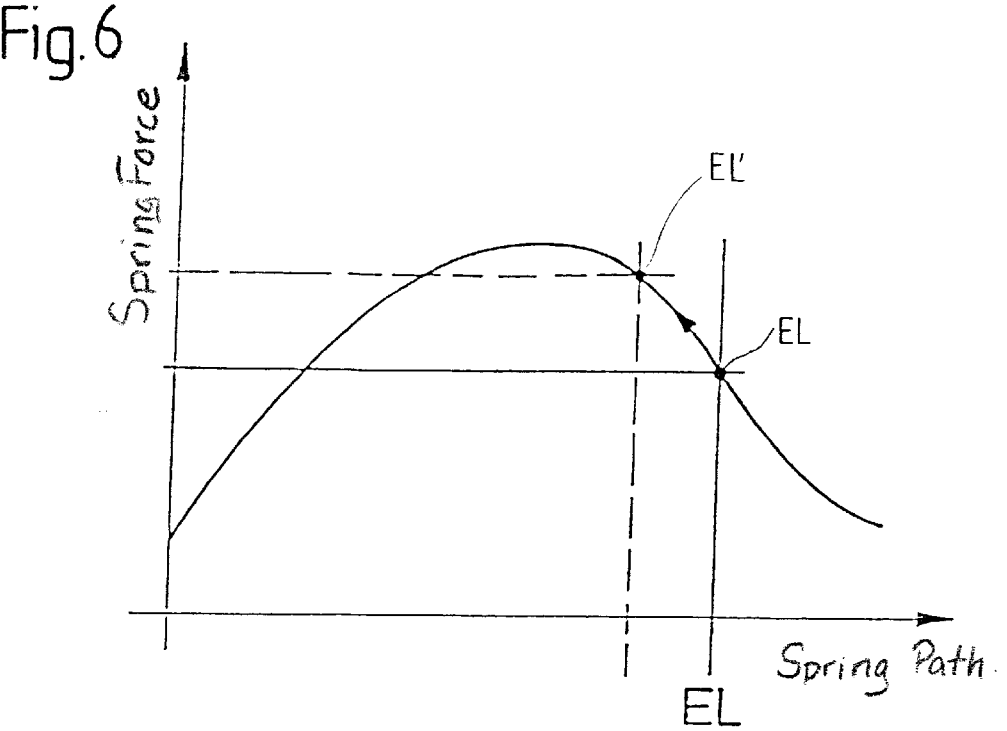
FIG. 6 is a force diagram of an energy accumulator formed as a diaphragm spring or disk spring showing the dependency of the spring force on the spring path.
Figure 7:
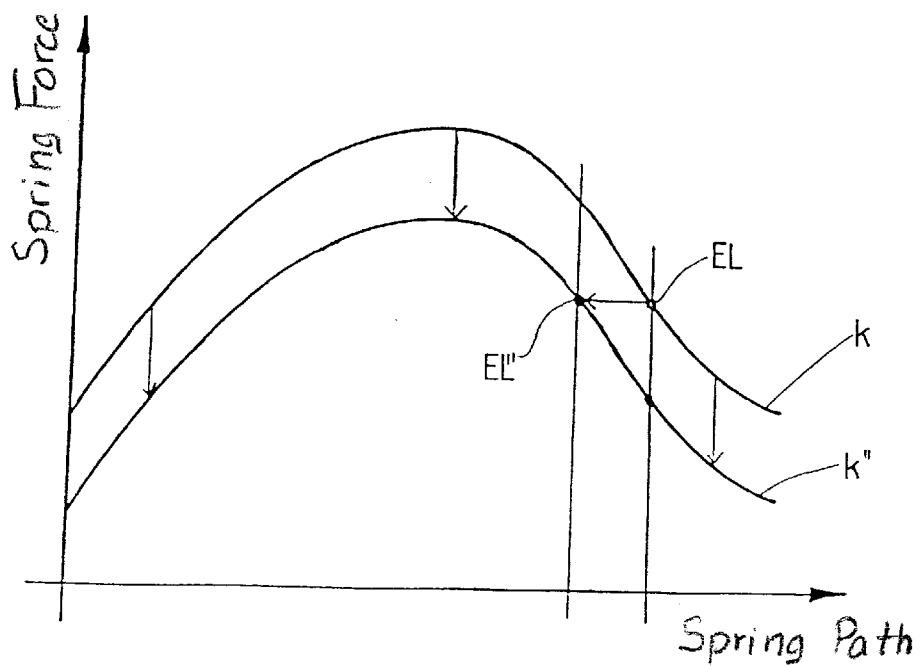
FIG. 7 is a diagram corresponding to FIG. 6 which shows the influence of aging on a spring force characteristic.

With an arrangement of this kind, as was described in the beginning, a characteristic of the thrust plate assembly that changes over time may be taken into account. This is described with reference to the diagrams of FIGS. 6 and 7. FIG. 6 shows a force curve over the spring path or spring travel of a diaphragm spring used as energy accumulator. The installation position occupied by a diaphragm spring of this type when no wear has occurred, i.e., when it is new, is designated by EL. The installation position occupied by a diaphragm spring of this kind after wear has occurred is designated by EL'. It will be seen that the change in installation position has caused the force to approach the force maximum, for example, in the clutch engagement position. Wear compensation is performed for purposes of compensation as was described in the beginning, so that the installation position represented in the diagram in FIG. 6 is held constant by the spring path parameter.

However, the present invention also allows variables other than occurring wear to be taken into account such as, for example, the effect of so-called spring setting. The term "spring setting" relates to the changing of a spring constant of a diaphragm spring or disk spring over their operating life. The setting is more dramatic in the initial period of operating life than at the end and is represented in the graph in FIG. 7 by the transition from curve K for the new state to curve K". Basically, it will be seen that the force characteristic, while remaining essentially intact qualitatively, shifts to lower forces, i.e., a lower force is associated with a corresponding installation position of a spring of this type. If it is taken into account, as shown in FIG. 6 and as described above, only that wear occurs in the operation of a clutch of this kind and if this wear is compensated in a ratio of 1:1 as is the case in the prior art, the result would be a steady decrease in spring force in the clutch due to the decrease in spring force, with installation position EL maintained constant, as a result of overcompensation. However, when it is ensured by the mechanism described in the preceding that the wear which actually occurs is not compensated in its entirety but only in a ratio of less than 1, a transition takes place to an installation position EL" which, although it is closer to the force maximum in the spring force curve for the used state, essentially corresponds to the new state of the clutch because of the drop in the curve. That is, the installation position changes to account for the changing spring characteristic so that the force generated in the clutch is maintained at a constant value. When a "setting" of an energy accumulator 16 comprising a diaphragm spring is to be accounted for, the ration is preferably with the range including 0.6–0.95.

Figure 4A:
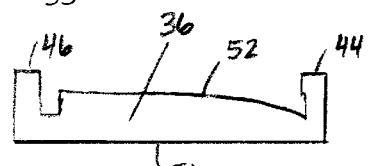
FIG. 4A is a view of a further embodiment of the stopping element of FIG. 4 having a non-linear wedge angle.
Figure 4:
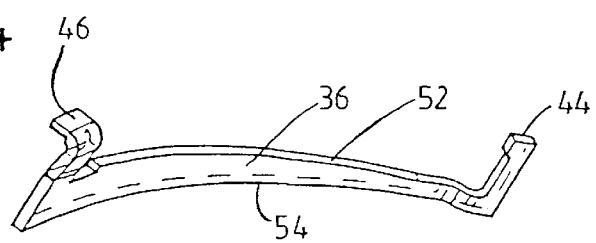
FIG. 4 is a perspective view of a stopping element used in the thrust plate assembly of FIG. 1.
Figure 5:
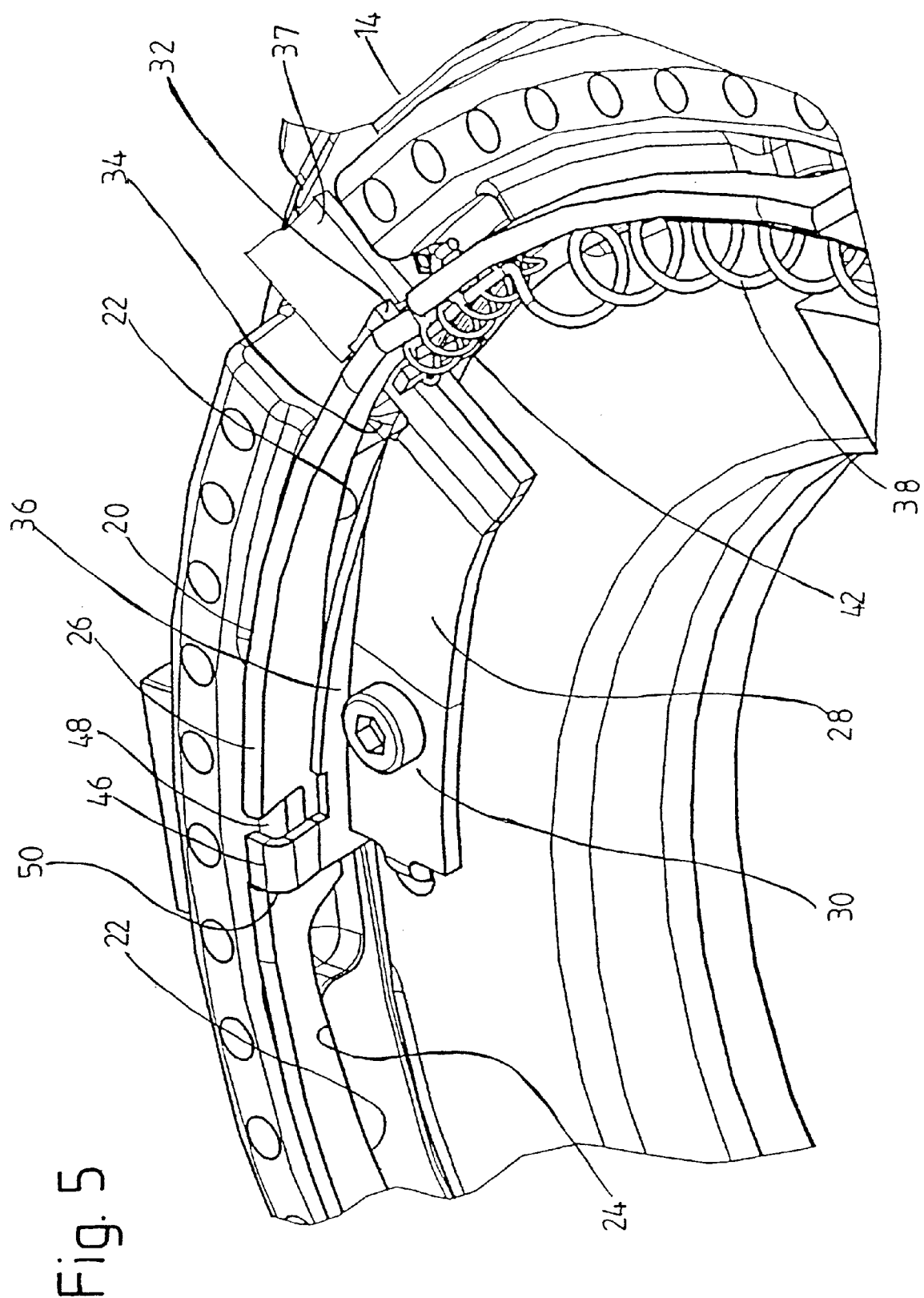
FIG. 5 is a perspective view of the thrust plate assembly according to FIG. 1.

Accordingly, the thrust plate assembly according to the present invention allows adaptation to very different operating parameters which change over the operating life of the thrust plate assembly. Furthermore, non-linearly changing variables may also be taken into account, for example, by a suitable construction of the stopping element 36. For example, when more undercompensation is required at the start of the operating life than toward the end of operating life, the wedge angle of the stopping element 36 may be arranged so that it is not constant, but rather has a greater wedge angle in an area of the stopping element 36 that cooperates with the detection portion 32 of the detection element 28 at the start of operating life than in an area of the stopping element 36 that cooperates with the detection portion 32 at the end of operating life. That is, the same extent of wear at the start of the period of operating life will lead to a smaller circumferential movement of the stopping element 36 and to a correspondingly smaller movement of the adjustment ring 20 in the compensation movement direction than at the end of the useful operating period. An exaggerated example of a non-linear or not constant wedge angle is shown in FIG. 4A. Appropriate variations of the stopping element 36 may be made to achieve any desired characteristics. The same result may also be achieved by arranging the inclined surface regions 22 or the counter-inclined surface regions 24 so that they do not have a constant angle of inclination relative to the circumferential direction and can then move along a supporting portion of the other respective subassembly.

The thrust plate assembly 10 according to the present invention has the further advantage that the stopping element 36 cooperates with the adjustment ring 20 so that the adjustment ring 20 blocked against movement in a wear adjustment movement direction when it is not acted upon by the energy accumulator 16. The stopping element 36 simultaneously forms a transport or assembly safety mechanism for the adjustment ring 20, so that no unwanted wear compensation occurs before assembling the thrust plate assembly, for example, with a flywheel, or before a subassembly formed of a pressure plate 14 and adjustment ring 20 is joined together with the housing 12 and energy accumulator 16. The location of the detection portion 32 of the detection element 28 partially axially between the adjustment ring 20 and the pressure plate 14 in the embodiment shown in FIGS. 1 to 5 simplifies construction. This embodiment also obviates the need to provide a relatively large circumferential cutout in the adjustment ring 20 in the region associated with the energy accumulator 16 for the detection portion 32 which is guided past the adjustment ring 20 from the radial inside to the radial outside, the function of this circumferential cutout being to allow the adjustment ring 20 to rotate freely with respect to the detection portion 32 over the entire operating life, that is, over the entire circumferential movement of the adjustment ring 20. Accordingly, the energy accumulator 16 acts upon the wear adjustment device 18 in a more uniform manner. The location of the detection portion 32 axially between the adjustment ring 20 and the pressure plate 14 is allowed because the detection element 28 does not have to act directly on the adjustment ring 20 or the wear adjustment device 18 to limit its adjusting movement with an axial stop. Rather, a limiting of the circumferential movement is provided for the adjustment ring 20 by the stopping element 36.

Figure 8:
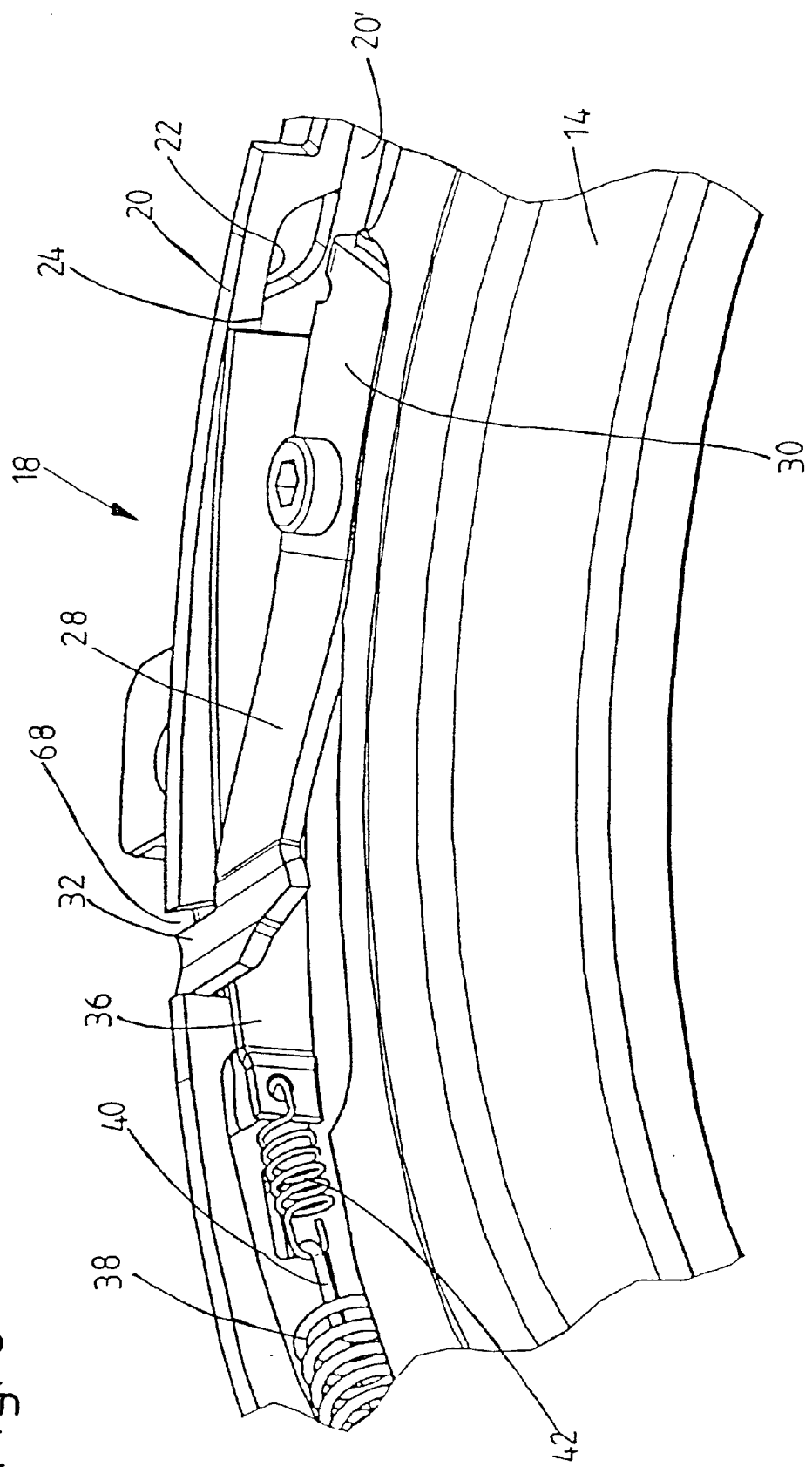
FIG. 8 is a perspective partial view of an alternative embodiment of the thrust plate assembly according to the present invention.
Figure 9:
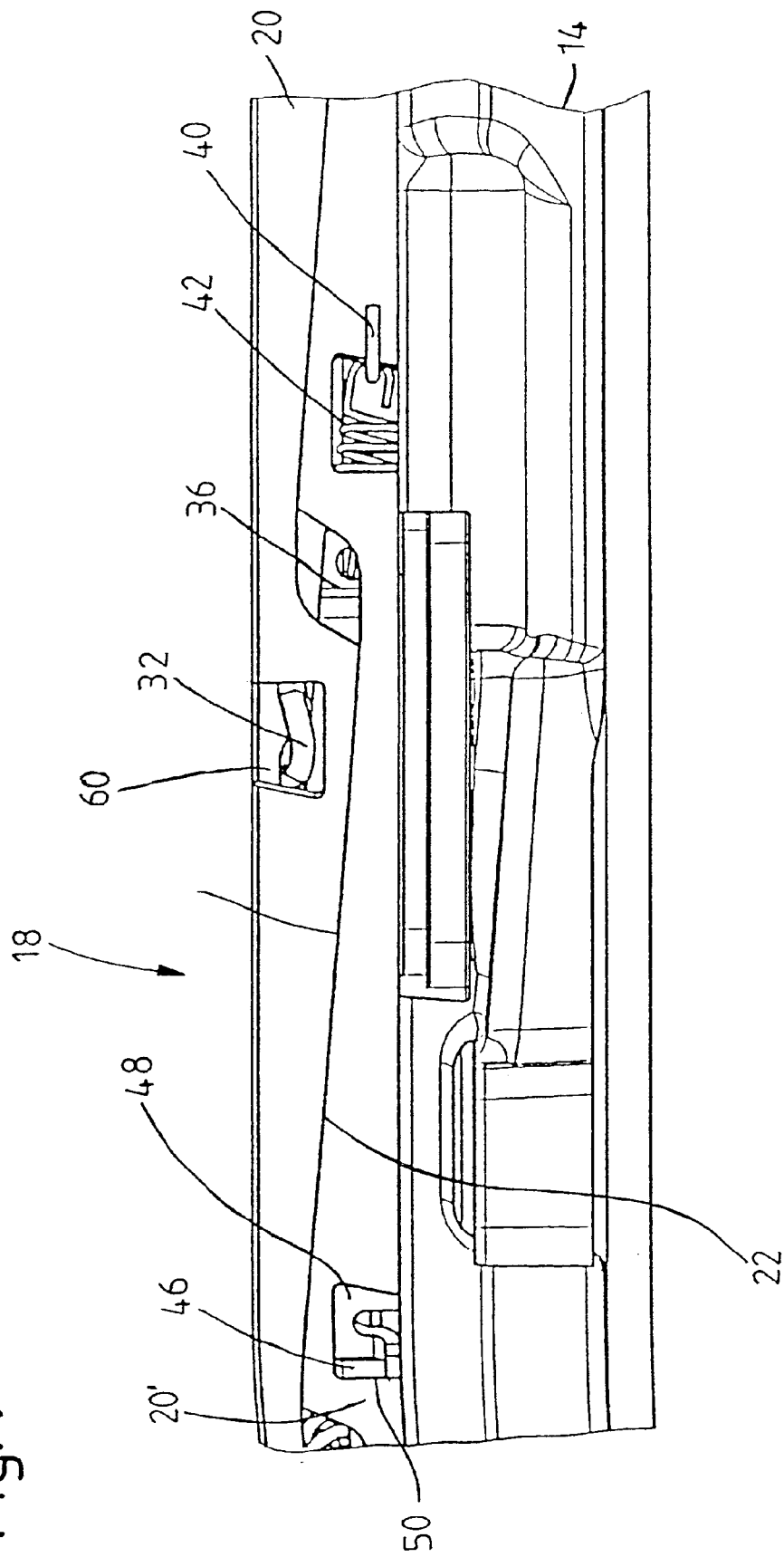
FIG. 9 is a view of the thrust plate assembly shown in FIG. 8 from the radial outer side.

Construction the thrust plate assembly 10 in FIGS. 1–5 is relatively simple because only an adjustment ring 20 is used in this embodiment. However, the principle of operation according to the present invention is also applicable in principle when using other adjustment elements, for example, wedge-shaped and/or radially moving adjustment elements. Furthermore, an embodiment form of the wear adjustment device 18 with two adjustment rings is also possible. An embodiment of the thrust plate assembly 10 having two adjustment rings is shown in FIGS. 8 and 9. In this embodiment, the wear adjustment device 18 has two adjustment rings 20 and 20' which contact one another by respective inclined surface regions 22 and counter-inclined surface regions 24. The first end portion 40 of the adjustment spring 38 is attached the adjustment ring 20' and the second end portion of the adjustment spring is fastened, for example, to the adjustment ring 20 or to the pressure plate 14.

In FIGS. 8 and 9, the detection portion 32 penetrates a circumferential recess 68 of the adjustment ring 20. The detection element 28 is fastened to the pressure plate 14 to ensure that the adjustment ring 20 is not movable in circumferential direction. Further, FIG. 9 shows that the detection portion 32 is not supported axially at the adjustment ring, i.e., it does not obstruct or block the axial movement of the adjustment ring 20 in the compensation movement direction.

The blocking projection 46 of the stopping element 36 engages the circumferential recess 48 of the adjustment ring 20' as in the previous embodiment of FIGS. 1–5. When wear occurs and application of the energy accumulator 16 is released, the wear adjustment device 18 functions such that the adjustment ring 20' moves in a circumferential direction until it strikes the blocking surface 50 of the blocking projection 46. The adjustment ring 20 which is held against rotation is displaced axially while the adjustment ring 20' moves in the circumferential direction for performing compensation by the inclined surfaces 22, 24 which slide against one another. The extent of the axial movement of the adjustment ring 20 is dependent on the ratio of the inclination of the inclined surfaces 22, 24 to the wedge angle of the stopping element 36. Thus, in this embodiment form the function of wear adjustment movement in the wear adjustment movement direction is performed by adjustment ring 20' and compensation movement in the compensation movement direction is performed by adjustment ring 20.

It is noted that in the examples described above the detection of wear is carried out with reference to the housing 12 when the play sensor, i.e., the detection element 28, is provided at the pressure plate 14. Of course, the wear could also be detected with reference to the energy accumulator 16, namely, in that the detection portion 32 acts at the energy accumulator 16. The detection portion 32 may pass through corresponding openings in the energy accumulator and contact the energy accumulator from the rear. The energy accumulator 16 also moves, that is, when wear occurs, relative to the pressure plate 14 and accordingly enables detection of wear.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A thrust plate assembly for a motor vehicle friction clutch with automatic wear compensation, comprising:
   a housing fixedly connectable to a flywheel for joint rotation with the flywheel about an axis of rotation;
   a pressure plate arranged in said housing so that said pressure plate is fixed with respect to rotation relative to said housing and axially displaceable relative to said housing;
   an energy accumulator having one side supported at said housing and another side supported at said pressure plate; and
   a wear adjustment device arranged in a support path of said energy accumulator between said energy accumulator and a component of one of said housing and said pressure plate, wherein said wear adjustment device includes at least one adjustment element displaceable to compensate for wear and said wear adjustment device is operatively arranged for effecting a wear compensation in proportion to the occurring wear, wherein a ratio of said wear compensation effected by said wear adjustment device to said occurring wear differs from 1:1.

2. The thrust plate assembly of claim 1, wherein said at least one adjustment element is movable in a wear adjustment movement direction corresponding to the occurring wear, wherein a movement of said at least one adjustment element in said wear adjustment movement direction displaces said at least one adjustment element in a compensating movement direction different than the wear adjustment movement direction, and wherein an extent of movement in the compensating movement direction for wear to the amount of occurring wear is in a ratio other than 1:1.

3. The thrust plate assembly of claim 2, wherein said at least one adjustment element comprises a first surface so that when said at least one wear adjustment element is moving in the wear adjustment movement direction, said first surface moves along a counter-surface, wherein one of said first surface and said counter-surface is inclined in the wear adjustment movement direction, and wherein an angle of inclination of said at least one of said first surface and counter-surface is selected such that the extent of movement in the compensating movement direction to the amount of occurring wear is in a ratio to wear other than 1:1.

4. The thrust plate assembly of claim 2, further comprising at least one play sensor arrangement arranged on a further component of said thrust plate assembly for detecting wear and a blocking element, said blocking element being displaceable relative to said further component in response to the occurring wear, wherein said at least one play sensor arrangement comprises a detection element having a detection portion arrangeable for interacting with said blocking element for detecting wear, wherein said detection element is displaceable to a position corresponding to the occurring wear by interaction with said blocking element, said thrust plate assembly further comprising a stopping element operatively arranged for stopping said detection element in the position corresponding to the occurring wear.

5. The thrust plate assembly of claim 4, wherein said stopping element is displaceable in a stopping movement direction by a movement extent corresponding to the occurring wear to stop said detection element in the position corresponding to the occurring wear, and wherein said stopping element comprises a blocking member operatively arranged for cooperating with said at least one adjustment element to limit the movement of said at least one adjustment element in said wear adjustment movement direction to an extent corresponding to the occurring wear.

6. The thrust plate assembly of claim 5, wherein said wear adjustment movement direction and said stopping movement direction are the same direction.

7. The thrust plate assembly of claim 6, wherein said stopping movement direction and said wear adjustment movement direction comprise a circumferential movement direction.

8. The thrust plate assembly of claim 6, wherein said blocking member comprises a stop acting in said wear adjustment movement direction.

9. The thrust plate assembly of claim 4, wherein said at least one adjustment element comprises a first surface so that when said at least one wear adjustment element is moving in the wear adjustment movement direction, said first surface moves along a counter-surface, wherein one of said first surface and said counter-surface is inclined in the wear adjustment movement direction, and wherein an angle of inclination of said at least one of said first surface and counter-surface is selected such that the extent of movement in the compensating movement direction to the amount of occurring wear is in a ratio to wear other than 1:1, and wherein said stopping element comprises a wedge-shaped element with a wedge angle, said wedge angle of said stopping element being different from an angle of inclination of said at least one of said first surface and counter-surface.

10. The thrust plate assembly of claim 9, wherein one of said wedge angle of said stopping element in said stopping movement direction and said angle of inclination of said at least one of said first surface and counter-surface in said wear adjustment direction is not constant.

11. The thrust plate assembly of claim 1, wherein said ratio is in the range including 0.6 to 0.95.

12. The thrust plate assembly of claim 1, wherein said ratio changes as a compensation of wear increases.

13. The thrust plate assembly of claim 12, wherein said ratio increases as the compensation of wear increases.

14. A thrust plate assembly for a motor vehicle friction clutch with automatic wear compensation, comprising:
a housing fixedly connectable to a flywheel for joint rotation with the flywheel about an axis of rotation;
a pressure plate arranged in said housing so that said pressure plate is fixed with respect to rotation relative to said housing and axially displaceable relative to said housing;
an energy accumulator having one side supported at said housing and and another side supported at said pressure plate;
a wear adjustment device arranged in the support path of said energy accumulator between said energy accumulator and a component of one of said housing and said pressure plate, said wear adjustment device having at least one adjustment element displaceable to compensate for wear, wherein said at least one adjustment element is pretensioned for movement in a wear adjustment movement direction, wherein said at least one adjustment element comprises a surface which moves along a counter-surface when said at least one adjustment element moves in said wear adjustment movement direction, wherein one of said surface and said counter-surface is inclined in the wear adjustment movement direction;
at least one blocking member operatively arranged for blocking said at least one adjustment element to prevent movement of said at least one adjustment element in the wear adjustment movement direction; and
at least one play sensor arrangement for detecting occurring wear and a blocking element displaceable with respect to another component of said thrust plate assembly in response to occurring wear, wherein said at least one play sensor arrangement comprises a detection element arrangeable for interacting with said blocking element and said detection element is displaceable to a position corresponding to the occurring wear by the interaction with said blocking element, said at least one play sensor arrangement further comprising a stopping element operatively arranged for stopping said detection element in the position corresponding to the occurring wear, and wherein said at least one blocking member is arranged on said stopping element.

15. The thrust plate assembly of claim 14, wherein said at least one blocking member is arrangeable for interacting with said at least one adjustment element to block said at least one adjustment element in said wear adjustment movement direction.

16. The thrust plate assembly of claim 14, wherein said counter-surface is formed at said component of one of said housing and said pressure plate.

17. The thrust plate assembly of claim 14, wherein said at least one detection element is arranged at said component of one of said housing and said pressure plate and further comprises a detection portion operatively arranged for interacting with said one of said component and subassembly.

18. The thrust plate assembly of claim 14, wherein at least a portion of said detection element is arranged between said at least one adjustment element and said pressure plate.

19. The thrust plate assembly of claim 17, wherein said at least one adjustment element comprises an adjustment ring arranged substantially concentric to the axis of rotation, said component of one of said housing and said pressure plate comprises said pressure plate, and said detection portion projects through an intermediate space formed between said adjustment ring and said pressure plate.

20. The thrust plate assembly of claim 14, wherein said stopping element is displaceable in a stopping movement direction by a movement amount corresponding to the occurring wear to stop said detection element in the position corresponding to the occurring wear.

21. The thrust plate assembly of claim 20, wherein said at least one adjustment element moves in a wear adjustment movement direction and said stopping element moves in a stopping movement direction, and wherein said wear adjustment movement direction and said stopping movement direction are in the same direction.

22. A friction clutch comprising a thrust plate assembly, wherein said thrust plate assembly comprises:
- a housing fixedly connectable to a flywheel for joint rotation with the flywheel about an axis of rotation;
- a pressure plate arranged in said housing so that said pressure plate is fixed with respect to rotation relative to said housing and axially displaceable relative to said housing;
- an energy accumulator having one side supported at said housing and another side supported at said pressure plate; and
- a wear adjustment device arranged in a support path of said energy accumulator between said energy accumulator and a component of one of said housing and said pressure plate, wherein said wear adjustment device includes at least one adjustment element displaceable to compensate for wear and said wear adjustment device is operatively arranged for effecting a wear compensation in proportion to the occurring wear, wherein a ratio of said wear compensation effected by said wear adjustment device to said occurring wear differs from 1:1.

23. A friction clutch comprising a thrust plate assembly, wherein said thrust plate assembly comprises:
- a housing fixedly connectable to a flywheel for joint rotation with the flywheel about an axis of rotation;
- a pressure plate arranged in said housing so that said pressure plate is fixed with respect to rotation relative to said housing and axially displaceable relative to said housing;
- an energy accumulator having one side supported at said housing and and another side supported at said pressure plate;
- a wear adjustment device arranged in the support path of said energy accumulator between said energy accumulator and a component of one of said housing and said pressure plate, said wear adjustment device having at least one adjustment element displaceable to compensate for wear, wherein said at least one adjustment element is pretensioned for movement in a wear adjustment movement direction, wherein said at least one adjustment element comprises a surface which moves along a counter-surface when said at least one adjustment element moves in said wear adjustment movement direction, wherein one of said surface and said counter-surface is inclined in the wear adjustment movement direction;
- at least one blocking member operatively arranged for blocking said at least one adjustment element to prevent movement of said at least one adjustment element in the wear adjustment movement direction; and
- at least one play sensor arrangement for detecting occurring wear and a blocking element displaceable with respect to another component of said thrust plate assembly in response to occurring wear, wherein said at least one play sensor arrangement comprises a detection element arrangeable for interacting with said blocking element for detecting wear, and said detection element being displaceable to a position corresponding to the occurring wear by the interaction with said blocking element, said at least one play sensor arrangement further comprising a stopping element operatively arranged for stopping said detection element in the position corresponding to the occurring wear, and wherein said at least one blocking member is arranged on said stopping element.

* * * * *